United States Patent
Jo et al.

(10) Patent No.: US 7,734,835 B2
(45) Date of Patent: Jun. 8, 2010

(54) METHOD AND APPARATUS OF SETTING-UP CONFIGURATION OF DISPLAY DEVICES

(75) Inventors: Su Deok Jo, Daegu (KR); Byung Gon Kim, Daegu (KR)

(73) Assignee: LG Electronics Inc., Seoul (KR)

(*) Notice: Subject to any disclaimer, the term of this patent is extended or adjusted under 35 U.S.C. 154(b) by 343 days.

(21) Appl. No.: 11/274,188

(22) Filed: Nov. 16, 2005

(65) Prior Publication Data
US 2006/0117115 A1 Jun. 1, 2006

(30) Foreign Application Priority Data
Nov. 29, 2004 (KR) .................. 10-2004-0098394

(51) Int. Cl.
*G06F 3/00* (2006.01)
(52) U.S. Cl. ............... 710/8; 725/117; 725/132
(58) Field of Classification Search .......... 710/8; 725/95; 348/178
See application file for complete search history.

(56) References Cited

U.S. PATENT DOCUMENTS

| | | | |
|---|---|---|---|
| 5,666,293 A | 9/1997 | Metz et al. | |
| 5,877,745 A * | 3/1999 | Beeteson et al. | 345/156 |
| 5,887,193 A * | 3/1999 | Takahashi et al. | 710/8 |
| 6,008,836 A * | 12/1999 | Bruck et al. | 725/131 |
| 6,532,591 B1 | 3/2003 | Arai et al. | |
| 7,162,733 B2 | 1/2007 | Kamieniecki | |
| 2002/0059631 A1 * | 5/2002 | Lee | 725/108 |
| 2002/0147975 A1 | 10/2002 | Seo | |
| 2003/0202006 A1 * | 10/2003 | Callway | 345/719 |
| 2003/0219081 A1 | 11/2003 | Sheehan et al. | |
| 2005/0091699 A1 | 4/2005 | Poli et al. | |
| 2006/0059530 A1 * | 3/2006 | Spielman et al. | 725/132 |

FOREIGN PATENT DOCUMENTS

| | | |
|---|---|---|
| EP | 0838945 | 2/2004 |
| KR | 1999-021900 | 3/1999 |
| KR | 1020010010916 | 7/1999 |
| KR | 1020010076449 | 1/2000 |
| KR | 1020000055872 | 9/2000 |
| KR | 1020020069911 | 2/2001 |
| KR | 20-0253730 | 11/2001 |
| KR | 1020030043502 | 11/2001 |
| KR | 1020030063694 | 1/2002 |
| KR | 1020040043418 | 11/2002 |
| KR | 1020060089912 | 2/2005 |
| WO | WO 02/51151 | 6/2002 |
| WO | WO 2004/034361 | 4/2004 |

OTHER PUBLICATIONS

Chinese Office Action dated Jul. 27, 2007.
European Search Report dated Jan. 7, 2009.
Office Action for related U.S. Appl. No. 11/284,132, filed Nov. 22, 2005.

* cited by examiner

*Primary Examiner*—Henry W. H. Tsai
*Assistant Examiner*—Elias Mamo
(74) *Attorney, Agent, or Firm*—KED & Associates LLP (57) ABSTRACT

An apparatus of setting-up configuration of a display device includes a display device and a configuration set-up device. The configuration set-up device downloads configuration data from an external device and stores the downloaded data. When the configuration set-up device uploads the configuration data to the display device, configuration of the display device is automatically set-up according to the uploaded configuration data, which define a set of options associated with operation of the display device.

25 Claims, 10 Drawing Sheets

| LG Hotel Menu Set up | |
|---|---|
| Channel Menu Display | Yes |
| Channel Change | Yes |
| Input Mode Change | Yes |
| Fixed Volume | Yes |
| Max Volume | 99 |
| OSD Display | Yes |
| Remocon Operation | No |
| Local Key Operation | |
| On Monitor Operation | Yes |
| Volume | off |
| | 30 |
| Channel | off |
| | 1 |
| Auto Off Operation | Yes |
| Hotel Mode Operation | No |
| ▲▼ ◀▶ OK | |

FIG. 10

| 30 |      | 35 | C 04 |
| 31 | C 05 | 36 |      |
| 32 | C 51 | 37 | C 21 |
| 33 | C 41 | 38 | C 69 |
| 34 | C 05 | 39 | C 50 |

METHOD AND APPARATUS OF SETTING-UP CONFIGURATION OF DISPLAY DEVICES

This application claims the benefit of Korean Patent Application No. 10-2004-0098394, filed on Nov. 29, 2004, which is hereby incorporated by reference as if fully set forth herein.

BACKGROUND OF THE INVENTION

1. Field of the Invention

The present invention relates to a display system, and more particularly, to a method and apparatus of setting-up configuration of display devices.

2. Discussion of the Related Art

Generally, a remote controller is used to remotely control operation of a display device. The remote controller can remotely control various functions of the display device, such as external input option, channel option, volume option, and screen option (contrast, brightness, sharpness, tint, color, noise removal, and so on). Particularly, if a plurality of display devices are used in public places such as a hotel and an exhibition hall, since a plurality of users sometimes shift functions/options of the display devices using a remote controller, the shifted functions/options should be restored to the original functions/options. For example, functions/options of the display device setup/shifted by a guest of a hotel are initiated after the guest has checked out. Also, in case of the exhibition hall that uses the display device, video and audio of the display device are shifted to match an exhibition concept before the exhibition hall is opened. To shift and set-up functions/options of the display devices, a central computer connected to the display devices through a network controls the respective display devices. However, a problem arises in that much cost is required to construct a network for connecting the display devices to the central computer through a cable.

SUMMARY OF THE INVENTION

Accordingly, the present invention is directed to a display system and a method for controlling the same that substantially obviates one or more problems due to limitations and disadvantages of the related art.

An object of the present invention is to provide a display system and a method for controlling the same, in which functions/options of a display device are simply set-up without a network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method setting-up configuration of a display device includes the steps of downloading configuration data from an external device (e.g., a display device) to a configuration set-up device, storing the downloaded configuration data in a memory included in the configuration set-up device, and uploading the configuration data stored in the memory to a display device. When the data is uploaded, the configuration of the display device is automatically set-up according to the uploaded configuration data.

The configuration data define a unique set of options associated with the operation of the display device. For example, the set of options include at least one of channel menu display, channel change, input mode change, fixed volume, max volume, on-screen display (OSD), remote control operation, local key operation, on monitor operation, and auto off operation options. The configuration data may be downloaded through any one of an RS232C cable line, an IEEE1394 cable line, and a USB cable line.

In another aspect of the present invention, a method of setting-up configuration of a television (TV) receiver includes the steps of downloading a plurality of configuration data sets from an external device to a configuration set-up device, storing the downloaded configuration data sets in a memory included in the configuration set-up device, and selecting one of the stored data sets and uploading the selected data set to a plurality of television (TV) receivers by wireless data communication. When the selected data set is uploaded, the configuration of the display devices are automatically set-up according to the uploaded data set.

In another aspect of the present invention, an apparatus of setting-up configuration of a display device includes a display device and a configuration set-up device. The configuration set-up device initially downloads configuration data from an external device (e.g., a display device) and stores the downloaded configuration data. When user commands for data-upload are received, the configuration set-up device uploads the configuration data to the display device. Then the configuration of the display device is automatically set-up according to the uploaded configuration data.

The configuration set-up device includes a receiver, a memory, a transmitter, and a controller. The receiver receives the configuration data from the external device, which is then stored in the memory. On the other hand, the transmitter transmits the configuration data stored in the memory to the display device. The controller controls operations of the receiver, the memory, and the transmitter according to user's commands.

In another aspect of the present invention, an apparatus of setting-up configuration of a plurality of television (TV) receivers includes a plurality TV receivers and a configuration set-up device. The set-up device downloads a plurality of configuration data sets from an external device, stores the downloaded data sets, and uploads selected one of the data sets to each of the plurality of TV receivers. When the data is uploaded, configuration of each TV receiver is automatically set-up according to the uploaded data set.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
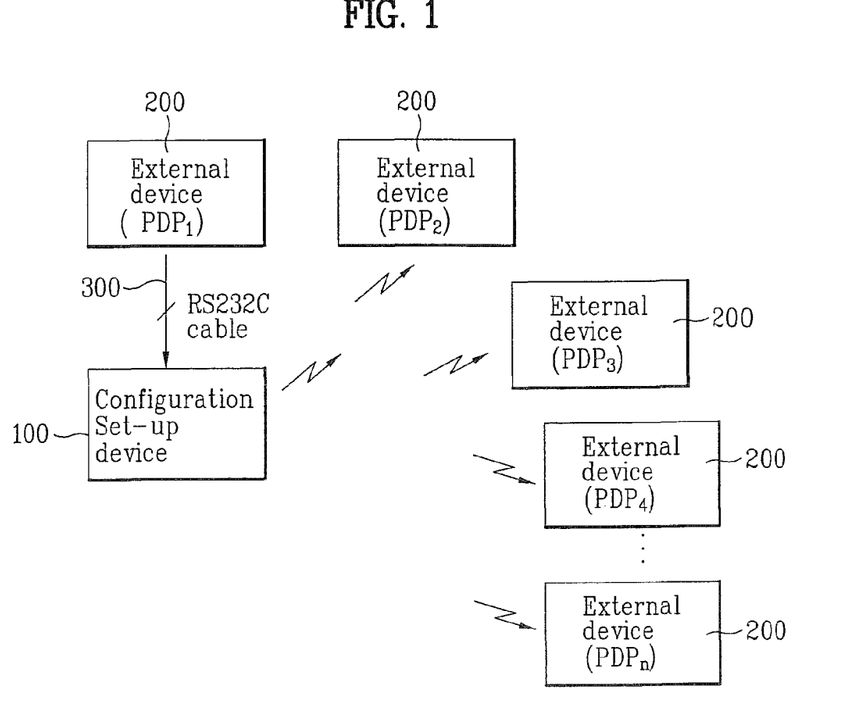
FIG. 1 is a block diagram illustrating a display system according to the present invention.

FIG. 1 is a block diagram illustrating an apparatus of setting-up configuration of a display device according to the present invention. As shown in FIG. 1, the appratus includes a configuration set-up device 100 and at least one display device 200.

The set-up device 100 is connected to the display device 200, configuration of which is set-up at user's desired functions/options, through a cable such as RS232C cable 300, IEEE1394 cable or USB cable, receives set-up information from the display device 200, and stores the received set-up information therein. The set-up information is to set-up functions and options associated with operation of the display device 200 and includes information on functions and options previously set by a user. For example, the set-up information includes automatic on/off function information, automatic screen option information, channel option information (channel number, desired channel, channel preference, and so on), audio option information (volume level, maximum volume, stereo, mono, and so on), and screen option information (contrast, brightness, sharpness, tint, color, noise removal, and so on). The set-up device 100 stores at least one set-up information and a set-up information list therein, and corrects/shifts the stored set-up information. The set-up device 100 transmits at least one set-up information selected by the user from the set-up information list to the display device 200 through a wireless transmitter such as an infrared transmitter.

Figure 2:
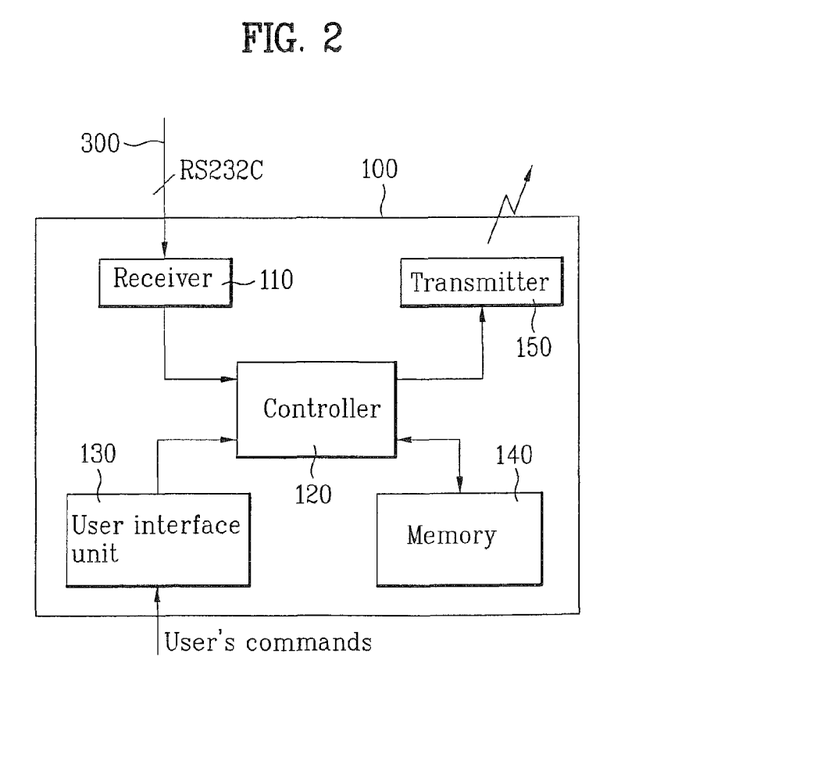
FIG. 2 is a block diagram specifically illustrating a set-up device according to the present invention.

FIG. 2 is a block diagram specifically illustrating the set-up device 100 according to the present invention. Referring to FIG. 2, a receiver 110 receives the set-up information from the display device 200 through the RS232C cable 300. A controller 120 receives the set-up information from the receiver 110, determines and modulates (frequency modulation and code modulation) the set-up information, and updates the set-up information list stored in a memory 140 on the basis of the received set-up information. A transmitter 150 converts the set-up information stored in the memory 140 to an infrared ray (IR) signal and transmits the infrared ray signal to the display device 200. A user-interface unit (e.g., a key input unit) 130 receives various commands input by the user, such as storing command, transmitting command and command to correct the set-up information, and transmits the received user's commands to the controller 120.

The set-up device 100 may further include a display unit (not illustrated). The display unit displays the set-up information stored in the memory 140 and the set-up information list. The user can correct the set-up information displayed on the display portion and select and output desired set-up information from the displayed set-up information list.

Figure 3:
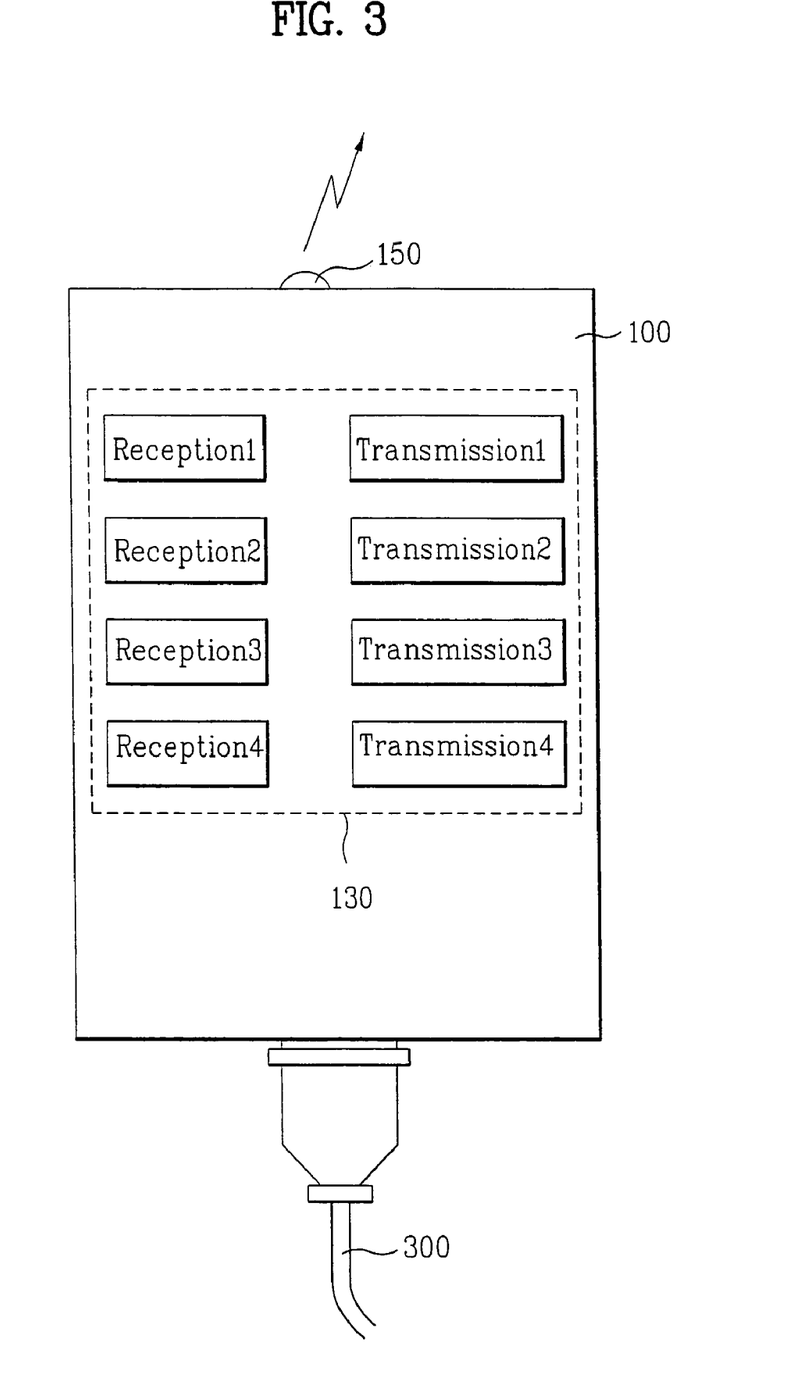
FIG. 3 illustrates appearance of a set-up device according to the present invention.

FIG. 3 illustrates one example of the set-up device 100. Referring to FIG. 3, the key input portion 130 of the set-up device 100 includes a plurality of receiving keys and a plurality of transmitting keys. If the user selects the receiving keys, the set-up device 100 receives the set-up information from the display device 200 through the RS232C cable and stores the received set-up information in the memory 140. The set-up device 100 stores four different set-up information in the memory 140 depending on four keys of the receiving keys and outputs the four different set-up information to the transmitter 150 depending on four keys of the transmitting keys.

Figure 4:
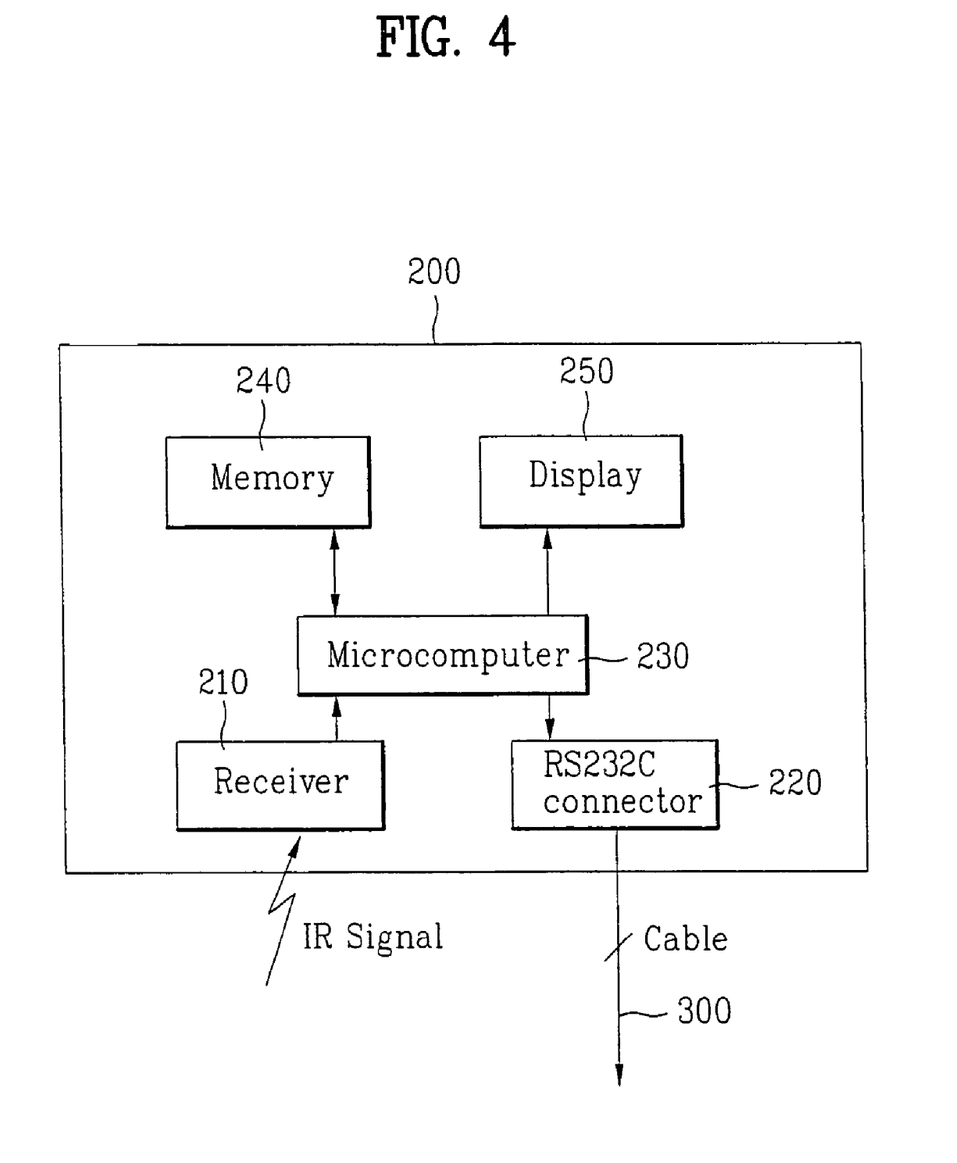
FIG. 4 is a block diagram specifically illustrating a display device according to the present invention.

FIG. 4 is a block diagram illustrating the display device 200 shown in FIG. 1. The display device 200 may be a monitor or TV formed of a liquid crystal display (LCD), a plasma display panel (PDP), or a cathode ray tube (CRT). Referring to FIG. 4, a receiver 210 of the display device 200 receives the set-up information transmitted from the set-up device 100 through the infrared ray signal, and receives user's command from a remote controller (not shown). The receiver 210 transmits the set-up information and the user's command to a microcomputer 230. The microcomputer 230 stores the received set-up information in a memory 240 and sets up functions/options of the display device 200, such as screen option function, audio option, screen option and channel option, on the basis of the stored set-up information. Also, the microcomputer 230 outputs the set-up information stored in the memory 240 through the RS232C cable 300 depending on the user's command. The output set-up information is transmitted to the set-up device 100 through the RS232C cable 300. Lastly, the display device 200 includes a display unit 250 for displaying video.

Figure 5A:
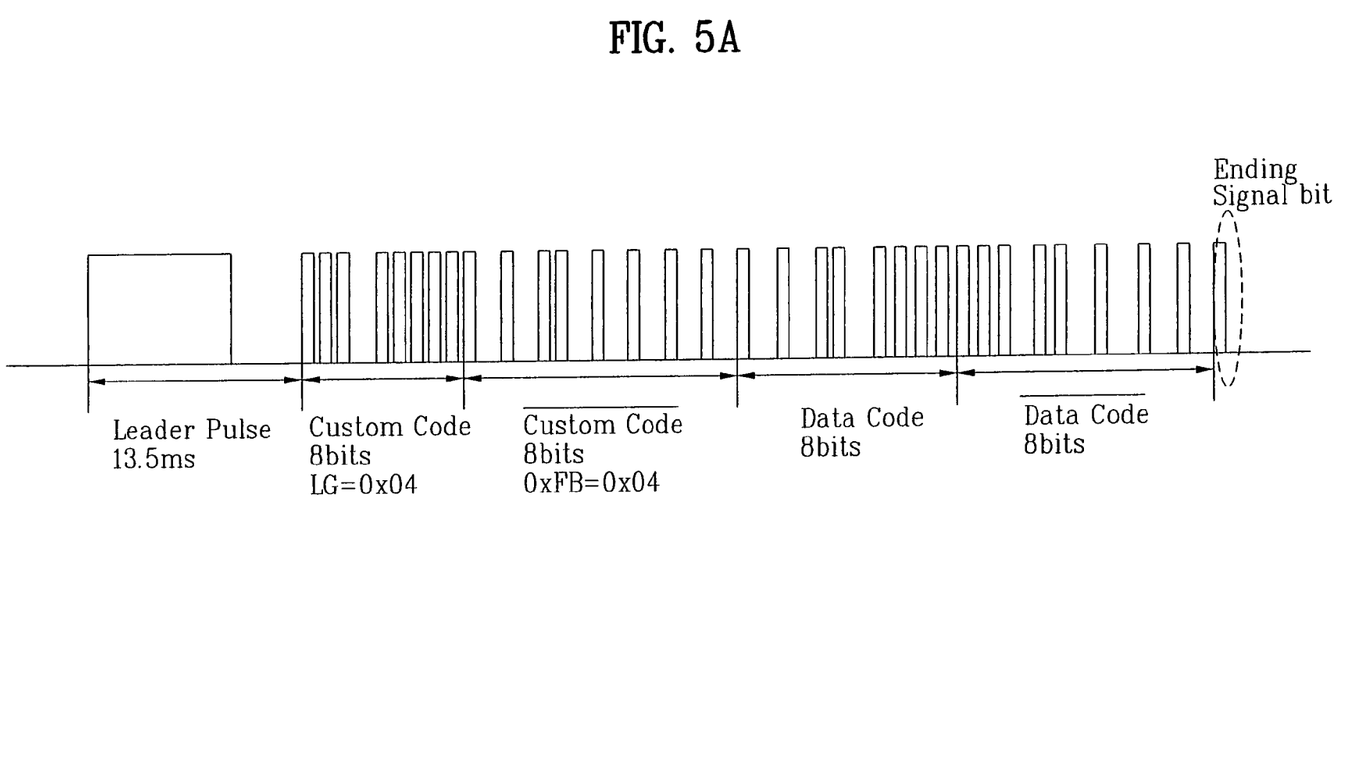
FIG. 5A illustrates a starting pulse output from a set-up device according to the present invention.

FIG. 5A illustrates a format of a starting pulse indicative of transmission of the set-up information output from the transmitter 150 of the set-up device 100. Referring to FIG. 5A, the starting pulse of the set-up information includes a header pulse (or leader pulse), custom codes of 8 bits, data codes of 8 bits, and an ending signal bit. In the embodiment of the present invention, the custom codes are 0x7F, 0x5F, 0x3F, and 0x1F.

Figure 5B:
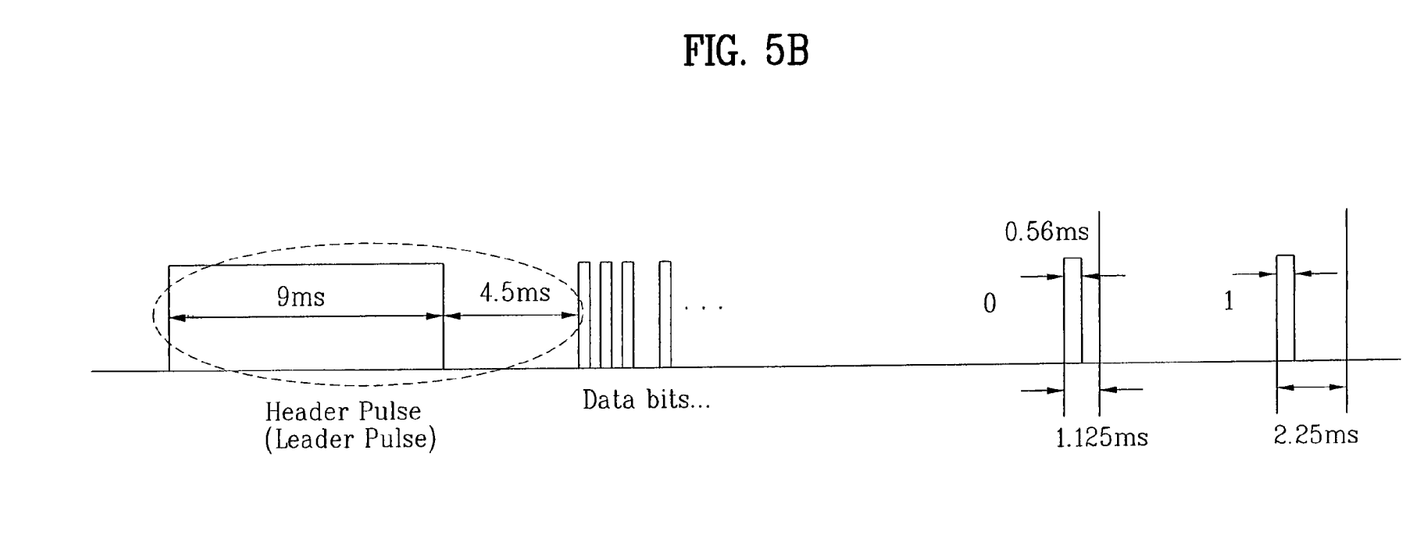
FIG. 5B is a timing chart of the starting pulse of FIG. 5A.

FIG. 5B is a timing chart of the starting pulse of FIG. 5A. Referring to FIG. 5B, the header pulse maintains "high" level for 9 ms and "low" level for 4.5 ms. The data bits included in the custom codes and the data codes are generated after the header pulse.

Figure 5C:
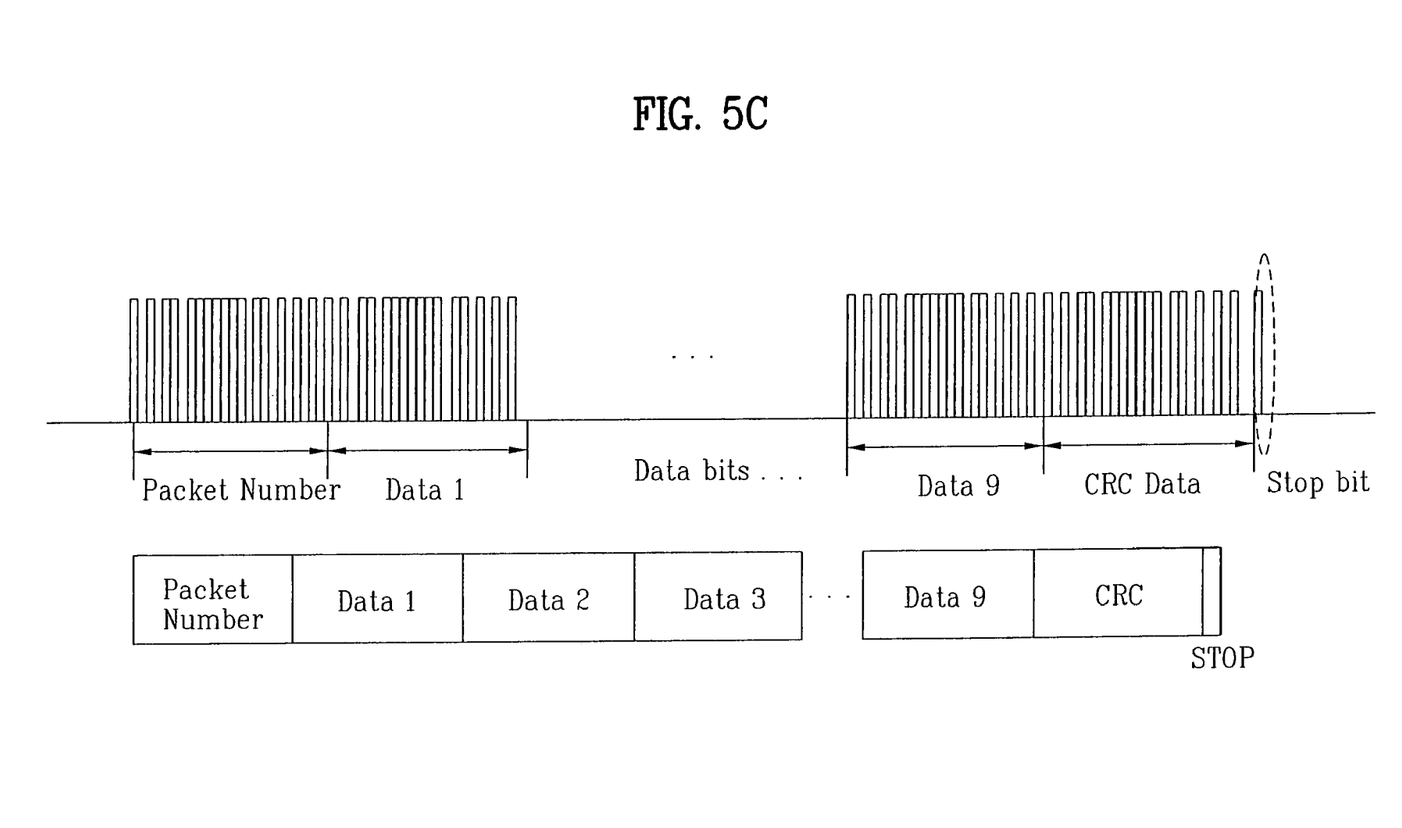
FIG. 5C illustrates a data pulse output from a set-up device according to the present invention.

FIG. 5C illustrates a format of a data pulse output from the transmitter 150 of the set-up device 100 following the starting pulse. Referring to FIG. 5C, the data pulse includes a packet number, nine data bit groups, cyclic redundancy check (CRC) data, and a stop bit.

Figure 5D:
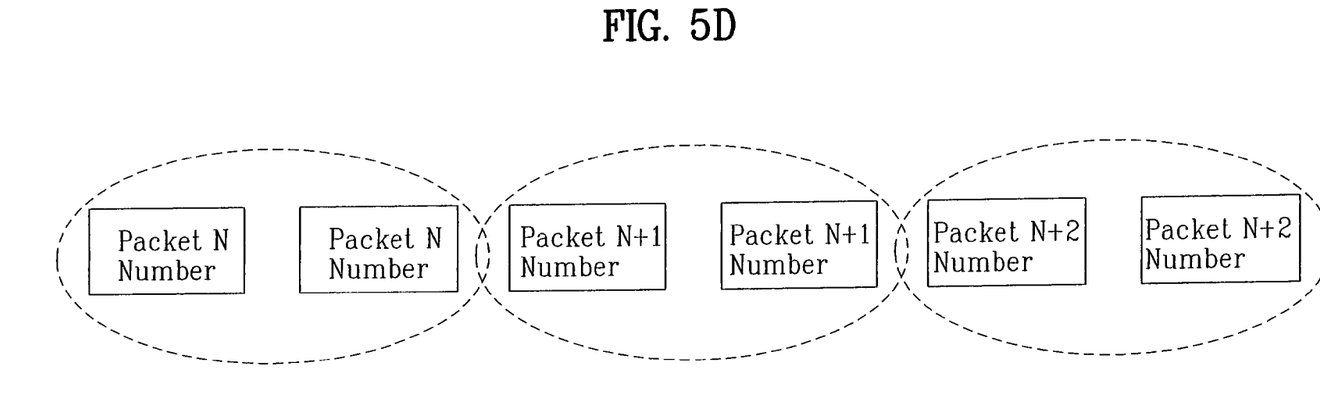
FIG. 5D illustrates packet data output from a set-up device according to the present invention.

FIG. 5D repeatedly illustrates packet data including at least one data pulse. In the embodiment of the present invention, all the packet data are repeatedly transmitted two times or more to avoid any error.

Figure 5E:
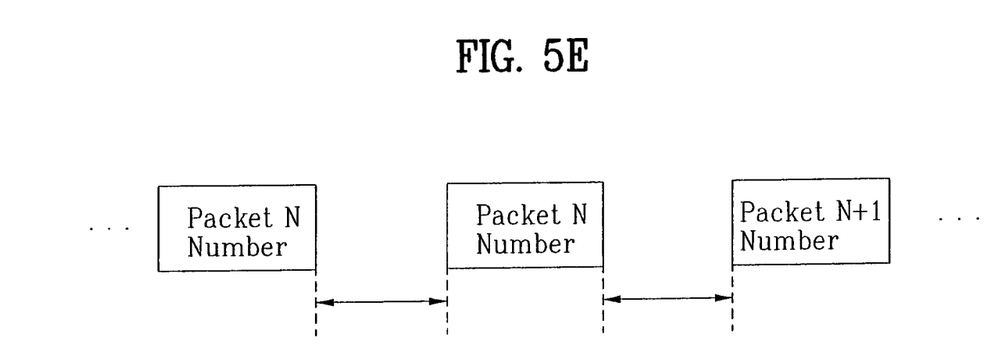
FIG. 5E is s a timing chart illustrating an interval between packet data.

FIG. 5E is s a timing chart illustrating a time interval between the packet data output from the transmitter 150. As shown in FIG. 5E, the time interval of the packet data is 45 ms.

Figure 6:
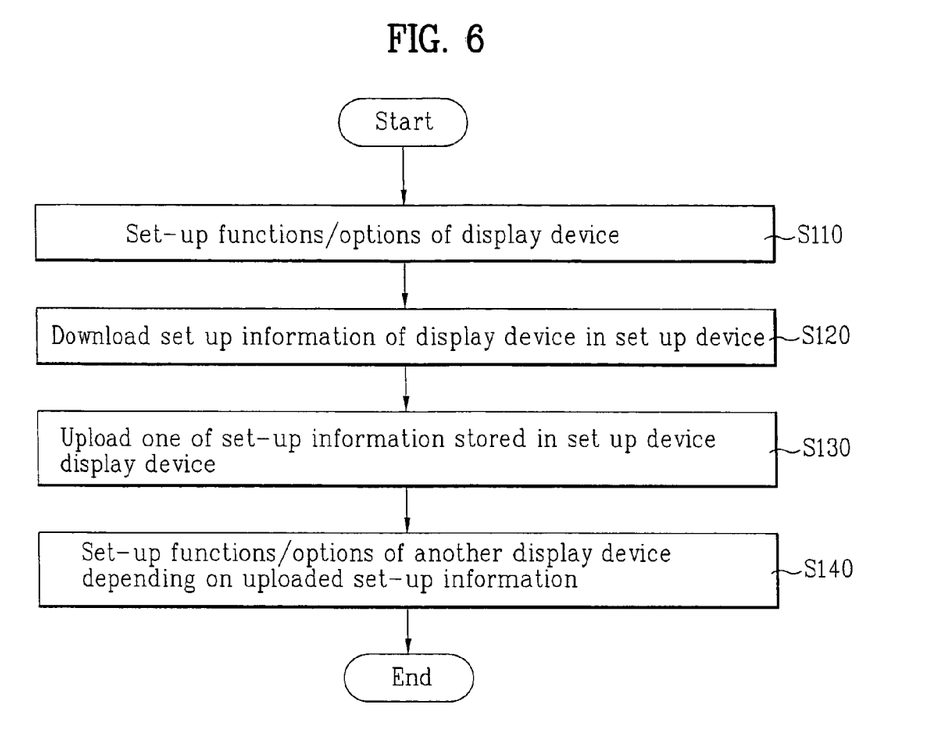
FIG. 6 is a flow chart illustrating a method for downloading set-up information according to the present invention.

FIG. 6 is a flow chart illustrating a method for downloading set-up information according to the present invention. A method for shifting/correcting the set-up information stored in the set-up device 100 and a method for downloading the set-up information stored in the set-up device 100 into the display device 200 will be described as follows.

Figure 7:
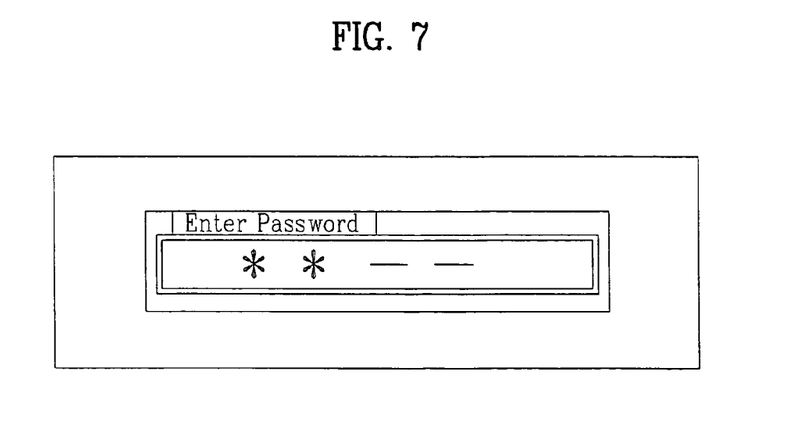
FIG. 7 illustrates a window for inputting a user's password in a set-up device according to the present invention.
Figure 8:
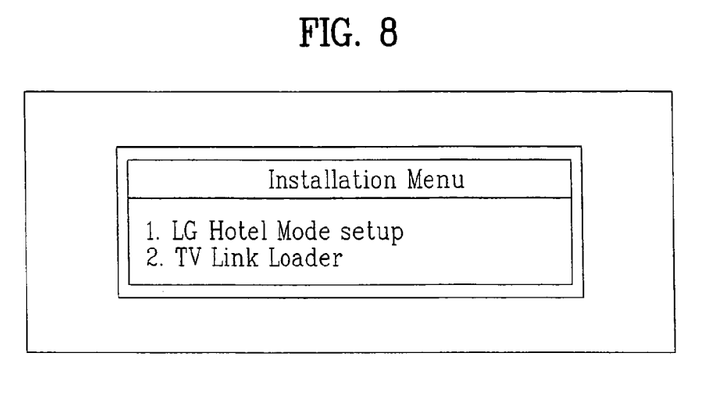
FIG. 8 illustrates an installation menu screen of a set-up device according to the present invention.
Figure 9:
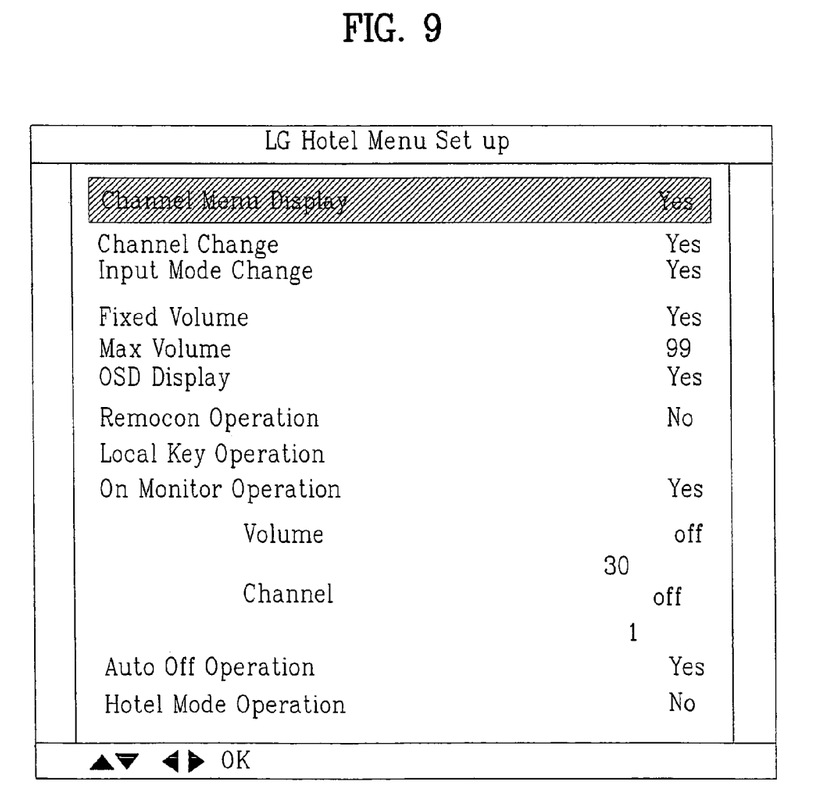
FIG. 9 illustrates an example of set-up information displayed on a set-up device according to the present invention.

First, the user sets up functions/options of the display device 200 at a user's desire in step S110, and stores the set-up information of the display device 200 in the set-up device 100 in step S120. If the user turns the set-up device 100 on to use the set-up device 100, the controller 120 of the set-up device 100 displays the window (display portion of the set-up device) for inputting the user's password as shown in FIG. 7. If the user inputs the password using the key input portion 130, the controller 120 authenticates the user on the basis of the input password and then displays an installation menu on the screen of the set-up device 100 as shown in FIG. 8. The installation menu includes options such as "hotel mode setup" and "TV link loader." For example, the user selects the option "hotel mode setup," the controller 120 reads the set-up information stored in the memory 140 and displays the read set-up information on the screen of the set-up device 100. Referring to FIG. 9, the displayed set-up information includes information for setting up functions and options of the display device 200. The user can shift the displayed set-up information on the screen using the key input portion 130 of the set-up device 100.

If the user selects the option "TV link loader" of FIG. 8, the controller 120 accesses another display device 200 through the transmitter 150. If the user selects a desired set-up information from the set-up information stored in the memory 140 in step S130, the controller 120 transmits the selected set-up information to the display device 200 through the IR signal in step S140. At this time, the controller 120 can transmit the selected set-up information to a plurality of the display devices 200 at the same time.

After receiving the set-up information from the set-up device 100, the display device 200 sets up various functions and options of the display device 200 on the basis of the received set-up information in step S150.

Figure 10:
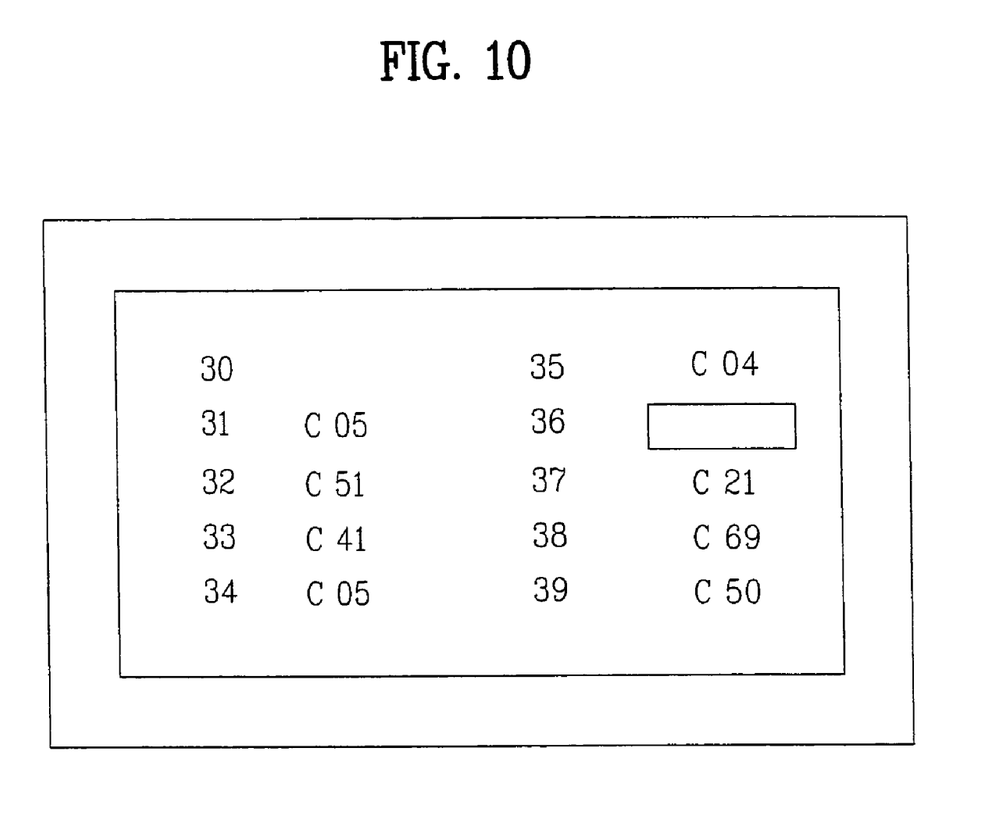
FIG. 10 illustrates an example of channel information displayed on a display device according to the present invention.

FIG. 10 illustrates channel information among the set-up information transmitted from the set-up device 100 to the display device 200. The channel number of the display device 200 can be set-up on the basis of the transmitted channel information.

The set-up device 100 can be connected to a personal computer. The personal computer includes a program for downloading the set-up information stored in the set-up device 100 and uploading them to the set-up device 100. The user can shift/correct the set-up information using the program included in the personal computer.

The aforementioned set-up device of the present invention can easily set-up functions and options of the display device. Particularly, the set-up device can collectively shift/setup functions/options of a plurality of the display devices used in public places such as a hotel and an exhibition hall.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for setting-up configuration of at least one display device, the method comprising:
    downloading a first set of configuration data from a first display device to a configuration set-up device having a plurality of reception buttons, a plurality of transmission buttons and a memory, the first display device having a predetermined configuration;
    storing the first set of configuration data in the memory; and
    uploading the first set of configuration data from the configuration set-up device to a second display device, or uploading a second set of configuration data to the first display device, the second set of configuration data different from the first set of configuration data,
    wherein the plurality of reception buttons controls the storing of different sets of downloaded configuration data in the memory including the first set of configuration data,
    wherein the plurality of transmission buttons controls uploading of the different sets of configuration data stored in the memory or other stored sets of configuration data to the display devices, respectively, the other stored sets of configuration data including the second set of configuration data, and
    wherein the display devices are automatically set-up according to the uploaded different or other sets of configuration data, and
    wherein the configuration set-up device uploads the different or other sets of configuration data through one or more all local wireless data communication links, each of the local wireless data communication links transferring a respective one of the different or other sets of configuration data for reception by corresponding ones of the display devices, through one or more signal paths that do not pass through a server of a network.

2. The method of claim 1, wherein the each of the different or other sets of configuration data defines a set of options associated with operation of a respective one of the display devices and wherein the set of options is determined by a user of the configuration set-up device.

3. The method of claim 2, wherein each of the display devices includes a television receiver and wherein the set of options for the television receiver includes at least one of options for a channel menu display, a channel change, an input mode change, a fixed volume, a max volume, an on-screen display (OSD), a remote control operation, a local key operation, an on monitor operation, or an auto off operation.

4. The method of claim 2, wherein the different sets of configuration data are downloaded to the configuration set up device through one of an RS232C cable, and IEEE 1394 cable, or a USB cable.

5. The method of claim 1, wherein the different or other sets of configuration data are uploaded to the display devices according to user operation of respective ones of the transmission buttons of the configuration set-up device.

6. The method of claim 1, further comprising:
    displaying, on a screen of the configuration set-up device, a list of the different sets of configuration data stored in the memory; and
    updating one or more of the stored sets of configuration data by making a selection from the displayed list, the one or more updated sets of configuration data including the second set of configuration data.

7. An apparatus for setting-up configuration of at least one display device, the apparatus comprising:
    a configuration set-up device having a plurality of receiving keys, a plurality of transmitting keys, and a memory, said configuration set-up device configured to:
    download a first set of configuration data from a first display device,
    store the first set of downloaded configuration data in the memory, and
    upload the first set of configuration data to a second display device, or upload a second set of configuration data to the first display device, to automatically set-up the first or second display devices, the second set of configuration data different from the first set of configuration data, wherein the plurality of receiving keys controls the storing of different sets of downloaded configuration data from a respective plurality of display devices in the memory, the different sets of configuration data including the first set of configuration data, wherein the plurality of transmitting keys controls uploading of the different sets of configuration data stored in the memory or other stored sets of stored configuration data to the display devices, respectively, the other stored sets of configuration data including the second set of configuration data, and wherein the configuration set-up device uploads the different or other sets of configuration data through one or more all local wireless data communication links the local wireless data communication links transferring the different or other sets of configuration data reception by corresponding ones of the display devices through one or more signal paths that do not pass through a server of a network.

8. The apparatus of claim 7, wherein each of the different or other sets of configuration data defines a set of options associated with operation of a respective one of the display devices, and wherein the set of options is determined by a user of said configuration set-up device.

9. The apparatus of claim 8, wherein each of the display devices includes a television receiver and wherein the set of options for the television receiver includes at least one of options for a channel menu display, a channel change, an input mode change, a fixed volume, a max volume, an on-screen display (OSD), a remote control operation, a local key operation, an on monitor operation, or an auto off operation.

10. The apparatus of claim 7, wherein the configuration set-up device comprises:
a receiver for receiving the different sets of configuration data from the display devices, the different sets of data received based on selection of corresponding ones of the receiving keys on the configuration set-up device; and
a transmitter for transmitting the different or other sets of configuration data to respective ones of the display devices based on selection of corresponding ones of the transmitting keys of the configuration set-up device.

11. The apparatus of claim 7, wherein the configuration set-up device comprises a user interface unit for inputting a user selection of one of the different or other sets of configuration data and for inputting a user selection of one of the display devices that is to receive the selected one of the different or other sets of configuration data through a corresponding one of the transmitting keys.

12. The apparatus of claim 11, wherein the configuration set-up device comprises a display unit for displaying a list of the different and/or other sets of configuration data stored in the memory.

13. The apparatus of claim 8, wherein the user of the configuration set-up device downloads the different sets of configuration data through one of an RS232C cable, an IEEE 1394 cable, or a USB cable.

14. The method of claim 1, further comprising:
selecting one of the different sets of stored configuration data,
wherein the selected set of configuration data is uploaded to one of the display devices based on selection of a corresponding one of the transmission buttons.

15. The apparatus of claim 11, wherein the user interface unit enables the different sets of stored configuration data to be updated by a user referencing the displayed list.

16. The method of claim 1, wherein the different or other sets of configuration data uploaded to the display devices are selected based on information input by a user into the configuration set-up device, said information input into the configuration set-up device without using any of the display devices.

17. The method of claim 16, wherein the configuration set-up device is directly coupled to the display devices through the one or more wireless data communications links.

18. The method of claim 17, wherein a direct point-to-point connection, that is different from a network connection, is established between the configuration set-up device and one or more of the display devices.

19. The method of claim 17, wherein the second set of configuration data uploaded to a respective one of the display devices is different from the different sets of configuration data downloaded to the configuration set-up device using corresponding ones of the reception buttons.

20. The method of claim 19, wherein the different sets of configuration data uploaded to respective ones of the display devices are selected based on information entered using a data input device of the configuration set-up device.

21. The method of claim 17, wherein the first set of configuration data transmitted to the second display device is simultaneously transmitted to other display devices over one or more wireless data communication links from the configuration set-up device,
wherein simultaneous transmission of the first set of configuration data is initiated by the configuration set-up device, and
wherein the one or more local wireless data communication links do not pass through a server of a network.

22. The apparatus of claim 7, wherein the different or other sets of configuration data uploaded to respective ones of the display devices are selected based on information input by a user into the configuration set-up device, said information input into the configuration set-up device without using any of the display devices.

23. The method of claim 1, wherein a one-to-one correspondence exists between the plurality of reception buttons and the display devices, each of the reception buttons controlling downloading of a set of configuration data from a respective one of the display devices for storage in the memory.

24. The method of claim 23, wherein a one-to-one correspondence exists between the plurality of transmission buttons and the display devices, the transmission buttons controlling transmission of the different or other sets of data to corresponding ones of the display devices.

25. The method of claim 1, wherein the second set of configuration data corresponds to the first set of configuration data having one or more configuration parameters changed based on a user instruction entered into the configuration device.

* * * * *